US011797663B2

(12) United States Patent
Harris (10) Patent No.: US 11,797,663 B2
(45) Date of Patent: Oct. 24, 2023

(54) PASSWORD MANAGEMENT SYSTEM AND METHOD FOR PROVIDING ACCESS TO A PASSWORD PROTECTED DEVICE

(71) Applicant: Osirium Limited, Theale (GB)

(72) Inventor: Andrew Steven Harris, Theale (GB)

(73) Assignee: Osirium Limited, Berkshire (GB)

( * ) Notice: Subject to any disclaimer, the term of this patent is extended or adjusted under 35 U.S.C. 154(b) by 172 days.

(21) Appl. No.: 17/256,904

(22) PCT Filed: Jun. 28, 2019

(86) PCT No.: PCT/GB2019/051833
§ 371 (c)(1),
(2) Date: Dec. 29, 2020

(87) PCT Pub. No.: WO2020/008175
PCT Pub. Date: Jan. 9, 2020

(65) Prior Publication Data
US 2021/0279325 A1 Sep. 9, 2021

(30) Foreign Application Priority Data
Jul. 3, 2018 (GB) ..................... 1810910

(51) Int. Cl.
*G06F 21/46* (2013.01)
*H04W 12/06* (2021.01)
*G06F 21/31* (2013.01)

(52) U.S. Cl.
CPC .............. *G06F 21/46* (2013.01); *G06F 21/31* (2013.01); *H04W 12/068* (2021.01)

(58) Field of Classification Search
None
See application file for complete search history.

(56) References Cited

U.S. PATENT DOCUMENTS 5,832,211 A   11/1998  Blakley, III et al.
5,838,903 A * 11/1998  Blakely, III ............ G06F 21/46
                                                              726/5
(Continued)

FOREIGN PATENT DOCUMENTS

EP       3304398       4/2018
WO    WO2014179386    11/2014

OTHER PUBLICATIONS

PCT International Preliminary Report on Patentability for corresponding PCT Application No. PCT/GB2019/051833 dated Jan. 14, 2021, 15 pages.

(Continued)

*Primary Examiner* — James R Turchen
(74) *Attorney, Agent, or Firm* — Lee & Hayes, P.C.; Bea Koempel-Thomas (57) ABSTRACT

Disclosed herein is a system and a method of providing access to at least one password protected device (D1-D5) via a password management system (100). The password management system (100) comprises first and second password management servers (200), each comprising a memory for storing an active password and a reserve password. The first and second password management servers (200) communicate the active and reserve passwords via a communication link (220). Either one of the first and second password management servers (200) requests access to the password protected device using the active password stored in the memory, and if the active password does not provide access, requests access using the reserve password.

20 Claims, 5 Drawing Sheets

(56) References Cited

U.S. PATENT DOCUMENTS

| | | | | |
|---|---|---|---|---|
| 5,862,323 | A * | 1/1999 | Blakley, III | G06F 21/46 726/13 |
| 7,950,051 | B1 * | 5/2011 | Spitz | H04L 63/0846 709/229 |
| 8,281,372 | B1 * | 10/2012 | Vidal | G06Q 20/405 709/206 |
| 9,973,488 | B1 * | 5/2018 | Roth | H04L 63/0807 |
| 9,984,217 | B2 * | 5/2018 | Mohamed | H04L 63/06 |
| 11,301,549 | B2 * | 4/2022 | Asher | H04L 9/088 |
| 2002/0002678 | A1 * | 1/2002 | Chow | H04L 63/083 713/169 |
| 2004/0260953 | A1 * | 12/2004 | Jamieson | H04L 63/0815 726/6 |
| 2007/0124807 | A1 * | 5/2007 | Jau | H04L 9/3226 726/6 |
| 2011/0265160 | A1 * | 10/2011 | Nettleton | G06F 21/31 726/6 |
| 2011/0277016 | A1 * | 11/2011 | Hockings | G06F 21/41 726/8 |
| 2012/0060213 | A1 * | 3/2012 | Childress | G06F 21/31 726/18 |
| 2014/0089671 | A1 | 3/2014 | Logue et al. | |
| 2014/0365762 | A1 * | 12/2014 | Lewis | G06Q 20/4012 713/155 |
| 2017/0111335 | A1 * | 4/2017 | Hibbert | H04L 63/083 |
| 2017/0200002 | A1 * | 7/2017 | Harris | G06F 21/41 |
| 2017/0244683 | A1 * | 8/2017 | Mohamed | H04L 63/083 |
| 2018/0004934 | A1 * | 1/2018 | Venkataramani | H04L 9/0891 |
| 2018/0150631 | A1 * | 5/2018 | Aguilar-Macias | G06F 21/46 |
| 2019/0116172 | A1 * | 4/2019 | Caldwell | H04L 67/53 |
| 2021/0334343 | A1 * | 10/2021 | Asher | H04L 9/3226 |

OTHER PUBLICATIONS

PCT Search Report for corresponding PCT Application No. PCT/GB2019/051833 dated Sep. 24, 2019, 6 pages.

\* cited by examiner

PASSWORD MANAGEMENT SYSTEM AND METHOD FOR PROVIDING ACCESS TO A PASSWORD PROTECTED DEVICE

This Application, filed under 35 U.S.C. § 371, is a US National Stage application of PCT/GB2019/051833 filed Jun. 28, 2019, which claims priority to GB 1810910.8, filed Jul. 3, 2018, which is incorporated herein by reference.

FIELD OF INVENTION

This invention relates to controlling access to a device within a computer network. In particular, but not exclusively, the invention may relate to controlling access and password management within a distributed access control system.

BACKGROUND

A computer network within an organisation will typically contain a number of devices, which may be distributed across several locations, possibly in different regions, jurisdictions, and/or continents. The devices may include PCs, servers, switches, routers, wireless access points, etc.

In order to keep the device secure from unwanted interactions or control from within and/or outside the network, the devices may be protected by a password. A "password" in this instance may comprise any data that may be used to log in to an account for controlling access to the device.

Access to the devices in the network might be provided to users outside the network, and provided by an access control system. An example access control system is a single sign-on system, wherein a user can provide a single set of user credentials to gain access to a plurality of devices in the network. The access control system can hold information on which devices can be accessed by a user, based on the provided user credentials.

The system providing access to the devices may be a distributed system, wherein multiple elements can control access to the whole or portions of the network of which the devices form a part. The elements can be placed in the same location, or they may be geographically distributed across different regions, jurisdictions and/or continents, like the devices. In order to work as a single access control system, the different elements in the system are interconnected so that they can communicate and share information required to enable the distributed elements to work in unison.

For example, in order to keep devices on a network secure, the passwords required to access the devices can be updated. The updates may be at regular times, regular time intervals, or triggered by specific events. When a password is updated in a distributed system, this information needs to be shared with the other elements of the access control system, so that the different elements of the system can continue to provide access to devices after their password data has been updated. A failure to share password updates among the different elements of a distributed access control system can adversely affect the functionality of the system, and lead the system failing to provide access to users which should be able to validly access a device.

The invention disclosed herein is concerned with providing improvements to the system and method for managing the access and security of devices in a distributed access system for a distributed network.

SUMMARY

According to an aspect of the invention, there is provided a method of providing access to at least one password protected device via a password management system comprising first and second password management servers in data communication via a communication link, the method comprising: determining, at the first password management server, an active password which is registerable as a device password with, and provides access to, the at least one password protected device, and at least one reserve password; transmitting the active password and the at least one reserve password to the second password management server via the communication link, the active password for accessing the at least one password protected device from either or both of the first and second password management servers; after communication of the active password and the at least one reserve password to the second password management server, further requesting, by the second password management server, access to the at least one password protected device using the active password; and, if the further request using the active password does not provide access, requesting access using one or more of the at least one reserve passwords.

An advantage of this method is that the second password management server, in case an update to the device password failed to be communicated to the second password management server, the password management server can still gain access to the device.

Optionally, the method further comprises, if one of the at least one reserve password provides access to the at least one password protected device, updating the active password at the second password management server with the corresponding reserve password. An advantage of this is that the second password management server may update its active password to the device password.

Optionally, the method further comprises the second password management server transmitting a message to the first password management server via the communication link to determine whether the first password management server has updated the active password registered with the at least one password protected device with one of the at least one reserve passwords.

Optionally, the method further comprises the second password management server determining that the communication link has failed if no response is received to the transmitted message. An advantage of determining a failed communication link is that the password management server aware of a failure may take this into account, for example when updating an active password, or communicating with other entities in the password management system.

Optionally, the method comprises the first password management server updating the device password at the password protected device with one of the at least one reserve passwords and transmitting a notification of the update to the second password management server via the communication link.

Optionally, a failure of the communication link between the first and second password management servers has occurred such that the second password management server does not receive the notification of the update.

Optionally, the method further comprises one of the first and second password management servers updating the device password registered with the device with one of the at least one reserve passwords, recording the time at which the device password was updated, and transmitting a notification of the update and the recorded time to the other of the first and second password management servers. An advantage of including a recorded update time may be that the password management servers may know when the update occurred, in case one or more of sending, transmission, or receipt of the notification are delayed.

Optionally, the method further comprises, upon failure to send the notification to the other of the first and second password management servers, the one of the first and second password management servers holding the notification for sending when the communication link is restored.

Optionally, the method further comprises, after restoration of the failed communication link, the one of the first and second password management servers transmitting the notification, and the other of the first and second password management servers receiving the notification, and updating the active password to be consistent with the update based on the received notification. This enables a password management server that has experienced a failure of one or more communication links to other entities in the system, to bring itself up to date when the communication link is restored.

Optionally, the notification also contains an identification of the password management server performing the update.

Optionally, the method further comprises one of the first and second password management servers transmitting a request to the second password management server for permission to update the device password and taking one or more of the following actions: if permission is received in response to the request, updating the device password to be one of the at least one reserve passwords; if permission is denied in response to the request, not updating the device password to be one of the at least one reserve passwords; if no response is received in response to the request: attempting to access the device with the active password and if access is granted, updating the device password to be one of the at least one reserve passwords; if access is not granted using the active password, attempting to access the device with one of the at least one reserve passwords and if access is granted, updating the active password for the one of the first and second password management servers to be one of the at least one reserve passwords.

Optionally, the method further comprises the first password management server being scheduled, in a predetermined timeframe, to update the active password of the at least one password-protected device to be a predetermined one of the at least one reserve passwords, and the second password management server, if it does not receive a notification by the end of the predetermined timeframe that this update has been performed, updating its active password to be the predetermined one of the at least one reserve passwords.

Optionally, the method further comprises a password management server updating its active password one or more times, and if the updated active password does not provide access to the device, the password management server changing its active password to be a former active password from before one or more of the one or more active password updates.

Optionally, the method further comprises, a password management server restoring itself from a backup, wherein restoring from a backup comprises setting the active password to be a former password, and subsequently updating the active password to be the one of the reserve passwords stored in the backup that matches the device password at a current time.

According to another aspect of the invention, there is provided a method of restoring an active password in a password management server, the active password for providing access to at least one password protected device via first and second password device management servers in data communication via a communication link, the method comprising: determining at the first password management server, an active password which is registerable with and provides access to the at least one password protected device; transmitting the active password to the second password management server via the communication link; following a failure of the communication link, updating, at least once, the active password at the first password management server; following restoration of the communication link, transmitting notification of the at least one update to the active password from the first password management server to the second password management server; and restoring the active password at the second password management server based on the transmitted notification. It is understood herein that restored encompasses restoring an active password of a password management server to an updated version of the active password, so as to enable accessing the device from that password management server with the restored active password.

Optionally, the method further comprises recording a time of the at least one update to the active password, wherein the transmitted notification comprises the recorded time.

Optionally, the first and second password management servers are any of a plurality of password management servers.

Optionally, the device is one of a plurality of devices.

According to another aspect of the invention, there is provided a computer program comprising instructions which, when executed on at least one processor, cause the at least one processor to carry out the method as set out above.

Optionally, there is provided a carrier containing the computer program, wherein the carrier is one of an electronic signal, optical signal, radio signal, or non-transitory computer readable storage medium.

According to another aspect of the invention there is provided a password management system for providing access to at least one password protected device, the password management system comprising: a first password management server; a second password management server; and a communication link connecting the first and second password management servers; the first password management server comprising a processor configured to undertake the steps of: determining an active password which is registerable as a device password with, and provides access to, the at least one password protected device, and a reserve password; communicating the active password and the reserve password to the second password management server via the communication link, the active password for accessing the at least one password protected device from either or both of the first and second password management servers; and the second password management server comprising a processor configured to undertake the steps of: after communication of the active password and the reserve password to the second password management server, further requesting, by the second password management server, access to the at least one password protected device using the active password; and if the further request using the active password does not provide access, requesting access using the reserve password.

According to another aspect of the invention there is provided a password management system for providing access to at least one password protected device, the password management system comprising: a first password management server; a second password management server; and a communication link connecting the first and second password management servers; the first password management server comprising a processor configured to undertake the steps of: determining at the first password management server, an active password which is registerable with and provides access to the at least one password protected device; transmitting the active password to the second password management server via the communication link; following a failure of the communication link, updating, at least once, the active password at the first password management server; following restoration of the communication link, transmitting notification of the at least one update to the active password from the first password management server to the second password management server; and the second password management server comprising a processor configured to undertake the steps of: receiving the transmitted notification; and restoring the active password at the second password management server based on the transmitted notification.

It is understood that the first password management server may be configured to perform the function and method steps of the second password management server, and the second password management server may be configured to perform the method steps of the first password management server.

BRIEF DESCRIPTION OF THE FIGURES

Exemplary embodiments of the invention are disclosed herein with reference to the accompanying drawings, in which.

DETAILED DESCRIPTION

Generally disclosed herein are password management systems and methods for controlling access to a device in a computer network, accessible by a plurality of password management servers. The system may be a privileged access management system. A distributed password management system may comprise a plurality of password management servers, able to provide access to a plurality of password protected devices on a computer network, to a plurality of users. In order to obtain access to a device, a user may contact one of a plurality of password management servers, and provide user credentials and request access to one or more devices. The password management server can check the provided user credentials and see if the user is entitled to access the one or more devices. To provide access, the password management server can use device access passwords for the one or more requested devices, stored on or accessible by the password management server, to log into the one or more requested devices, and provide access to the user. This allows the password management system to provide access to a secure network, without the user requiring knowledge of the device access passwords.

The device access passwords may need to be updated from time to time for various reasons, and the update may be instigated by any one of the password management servers, PMS, in accordance with pre-determined operations. If a password is updated by a single PMS, then it is necessary for each of the PMSs to be notified of the update and the respective passwords stored on the respective PMSs be updated. However, the communication link via which updates are communicated between the PMSs may be subject to intermittent failures which may prevent the notification of a password update and prevent the one or more of the other PMSs from updating a currently active password. This can lead to the apparent failure of passwords held by one or more PMSs and the loss of access. Further, a loss of access by a PMS may prompt that or other PMSs to update the active device password, thereby further fragmenting the PMSs.

To help reduce the impact of this problem, it can be beneficial to use an active and one or more reserve passwords. The active password may be the password which is current and provides access to a respective device. The reserve password(s) may be for future use as active passwords. That is, a plurality of reserve passwords may be determined and each time the active password is updated, one of the reserve passwords is used. The number of reserve passwords stored at any one time may be limited to avoid exposure to security threats, for example, in case the reserve passwords are exposed to or discovered by an unauthorised entity. The order of use of the reserve passwords may be sequential or otherwise known to all PMSs. The PMS may comprise a sliding window of stored future (or reserve) passwords, wherein a sequence of passwords is known to all PMSs, and a pointer indicates the current password. Updating the password may be effected by sliding the pointer to the next reserve password of the stored reserve passwords. Former passwords may be retained in memory by each PMS, so that a password to be used by a PMS may be updated to a future or former password by moving the pointer to a future or former password accordingly. This can be used to restore a password used by a PMS to a previous state, for example when restoring a PMS to a previous state including a former password from a backup, or in case of a failed password update. The reserve passwords may be predetermined and communicated between all of the relevant PMSs prior to use, typically when the active and reserve passwords are generated. Additional reserve passwords can be stored and may be added to the sliding window by appending them to the currently stored reserve passwords. This may be done when all PMSs confirm that they have received these new reserve passwords.

In some embodiments, the reserve password(s), when determined and transmitted by one password management server to one or more other password management servers, comprise only passwords which have not yet been used by those password management servers, that is to say, future passwords. In some embodiments, there may be a plurality of reserve passwords wherein the reserve passwords may comprise former passwords, that is to say, passwords that have already been used by the first and/or second password management servers to access one of the password protected devices. In such embodiments, any references in this specification to future passwords comprise only those of the reserve passwords which have not yet been used by the first and/or the second password management servers. In such embodiments, the plurality of reserve passwords comprises at least one password for future use future password. As an example, a reserve password that is a future password may be used to update the active password. A reserve password that is a former password may be used to restore a password management server to a previous state, for example if the password management server performed one or more active password updates that were not transmitted to and/or accepted by the device and/or one or more other password management servers, and not successfully implemented by the password management system. In such a case, the password management server may restore its active password to be a former password, where this reserve password matches the password currently providing access to the at least one password protected device.

For the purposes of the following disclosure, a password may be any credential used to gain access to a device. This may be a secret character string, a key, for example an application programming interface (API) key, token, or any other credential used to indicate and confirm identity of the user and/or entity providing the password. Password, in this disclosure, may also include identification of the user and/or entity providing the password, such as for example an account name or server name. Providing a password to gain access to an entity may comprise multiple steps. For example, it may include providing identification and secret key to an entity to be accessed, followed by use of a token to confirm identity throughout the interaction between the accessing and accessed entities. The password may be provided to a device or to an authentication service used to control access to the device. Providing or sharing a password may comprise providing a secret key itself, it may comprise sending password data comprising an encrypted version of the password, or it may comprise providing a pointer to a table containing password data. In this disclosure, a device password, or device access password, is the password, including any meaning of password as set out above, held by or for the device, and it is the password that must be matched to gain access to the device. An active password, or active device password, is a password stored on or for a PMS, which the PMS uses to request access to a device. Access is gained if the active password of the PMS matches the device password. A reserve password is a password stored on a PMS or on a separate entity accessible by the PMS which can be used to update the device password and active password. A reserve password may be used to update a device password and an active password of a PMS. Additional adjectives used to describe a password, for example updated active password, old device password, updated device password, etc. can be used to differentiate an amended version of a password relative to another version of that password, for example a former and current password, or old and updated password.

Under predetermined conditions, a PMS may require an update to a device password. Using predetermined reserve passwords, the device access password may be updated with the first reserve password to provide a new device access password. The device access password is thus updated at the device and in the PMS making the update. The old device access password is deactivated so as to no longer provide access.

The update may then be provided to each of the PMSs and, upon notification of an update, each PMS may update the stored active password with the first reserve password. The update in the PMSs may occur more or less contemporaneously with the update of the device to provide continuous access.

The use of reserve passwords is beneficial in this instance as it provides a pre-established option for when an attempt to gain access to the device using the last recorded active password by a PMS fails. Under these conditions, the PMS may attempt to gain access using the first reserve password. If this is successful, the PMS may determine that there has been an update by another PMS and proceed to update its internal register and/or determine more information about the update.

The following examples provide systems and methods in which the use of active and reserve passwords may be used to provide consistency within a password management system in which individual PMSs are in communication via a communication link.

Figure 1:
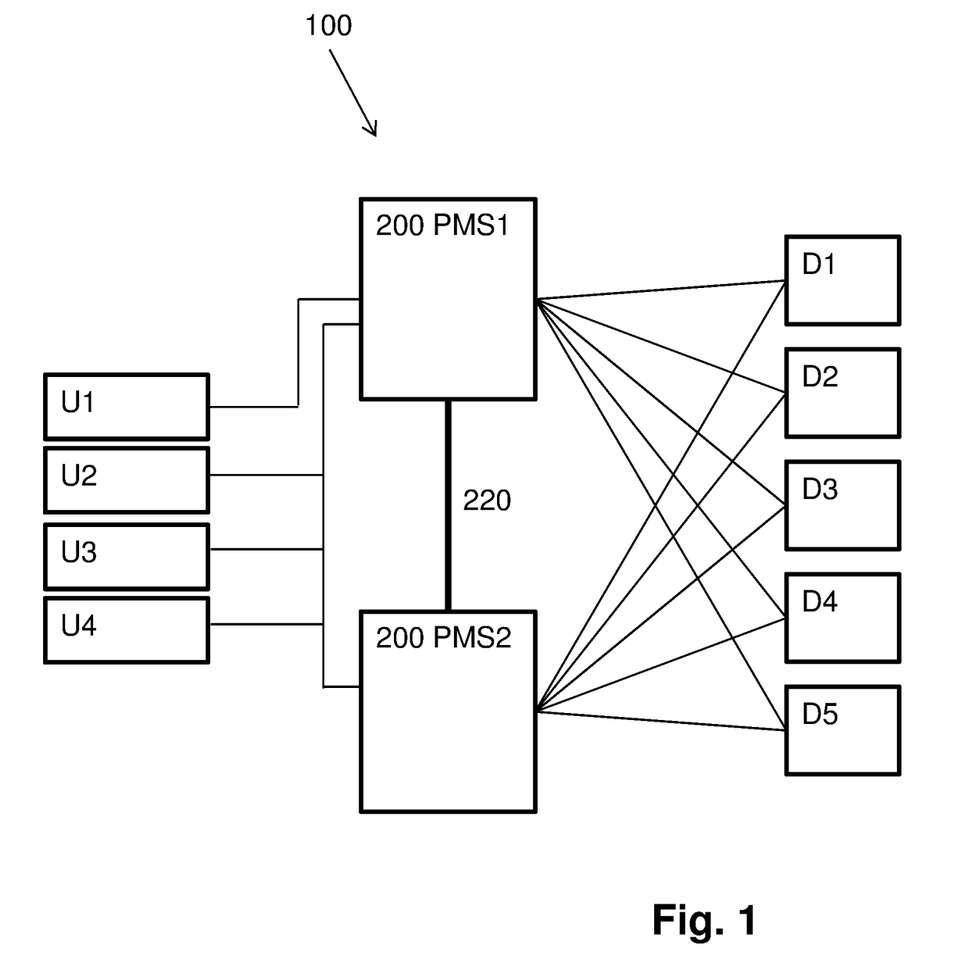
FIG. 1 shows an architecture of a distributed password management system.

FIG. 1 illustrates an embodiment of a distributed password management system 100 comprising two PMSs 200: a first password management server (PMS1) and a second password management server (PMS2). It will be appreciated that a system may include a plurality of PMSs and the limited example of a first and second PMS is chosen here for clarity only. It will also be appreciated that the use of first and second is arbitrary and interchangeable, and should not be taken to limit the PMSs in any way or imply any hierarchy, unless stated. The first and second PMS are each able to provide access to a plurality of shared password protected devices, for example, devices D1-D5.

Each PMS may additionally be able to provide access to additional devices, including devices shared with other PMSs not included in FIG. 1, or to local devices only accessible by a single PMS.

Devices D1 to D5 may include PCs, servers, laptops, tablets, mobile phones, multimedia storage devices, switches, bridges, routers, media converters, wireless access points, IP cameras, projectors, network attached storage, etc.

The first and second PMS 200 are connected via a communication link 220, which can be used by either or both of the first and second PMS to communicate with the other of the first and second PMS. A plurality of users U1-U4 may use the distributed password management device to access a device D1-D5. A user may be able to communicate with multiple PMSs of the distributed password management system to obtain access to a password protected device D1-D5, as indicated in FIG. 1 by users U2-U4. Alternatively, a user may be limited to use a specific PMS to request access to a password protected device D1-D5, as illustrated in FIG. 1 by user U1, connected only to PMS1. PMS2 may also have users only able to connect to this password management server to gain access to the devices D1-D5, not shown in FIG. 1.

The PMSs may be any suitable PMSs as known in the art. An exemplary PMS architecture and operation is provided below.

Figure 2:
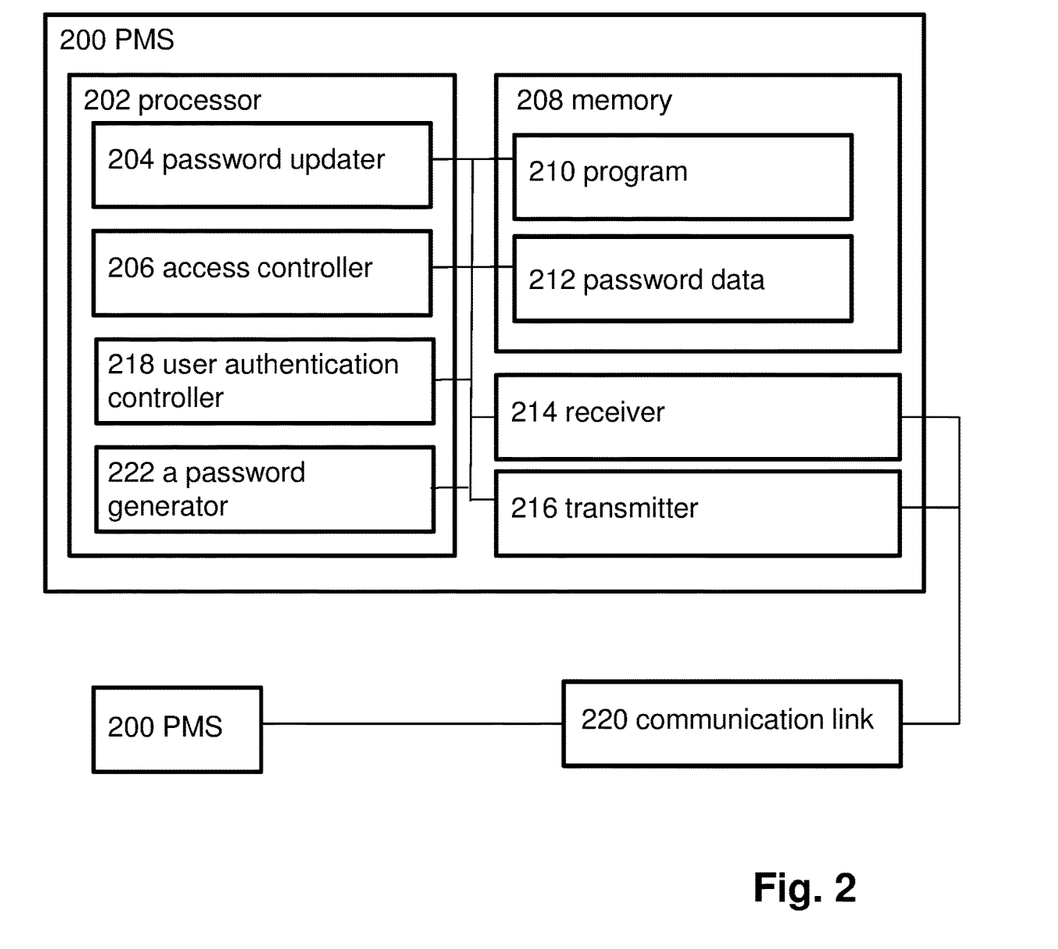
FIG. 2 shows a schematic diagram of a password management server.

FIG. 2 shows a schematic representation of an apparatus 200, which may be the first or second password management server PMS1 or PMS2 shown in FIG. 1. The PMS comprises a receiver 214 and a transmitter 216, which may be in data communication with other network entities such as devices D1-D5, other PMSs 200, and other entities such as back-up servers, databases, and other functions in a computer network. The receiver 214 and transmitter 216 may also be in data communication with users U1-U4. The receiver 214 and transmitter 216 are configured to receive and transmit data accordingly. The receiver 214 and transmitter 216 of a PMS 200 are responsible for handling any transmitted or received data communication sent or received by the PMS 200, including the actions and functions as described below.

The PMS 200 further comprises a processor 202 and a memory 208. The memory 208 may comprise a non-volatile memory and/or a volatile memory. The memory may have a computer program 210 stored therein, and the computer program 210 may be configured to undertake part of the methods disclosed herein. The computer program 210 may be loaded in the memory 208 from a non-transitory computer-readable medium on which the computer program is stored. The processor 202 may be configured to undertake one or more of the functions of a password updater 204, an access controller 206, and a user authentication controller 218, and may further also be configured to undertake the function of a password generator 222.

A password updater 204 is configured to perform an update of a device password for a password protected device, and to handle the updating of password data 212 stored in memory 208 relating to this device password on the PMS 200. The password updater may communicate with a password protected device to update the device password, via the transmitter 216 and receiver 214. The password updater 204 may update an active password stored in password data 212 by the PMS 200 used to access the password protected device, to be equal to the updated device password. The password updater 204 may also update password data 212 relating to reserve passwords stored by or accessible to the PMS 200, if a reserve password is used to be the updated device and active password. The password updater 204 may further communicate with other PMS 200 over communication link 220 to notify them of the updated device password and instruct them to update their password data 212 to be consistent with this update.

An access controller 206 may be configured to use password data 212 stored in memory 208 to request access to password protected devices using an active password stored in the password data 212.

A user authentication controller 218 may be configured to receive user login credentials, which may be linked to an account for accessing one or more secure devices D1-D5. The user authentication controller 218 may check the user login credentials to determine whether they provide the user with access to one or more of the protected devices. The user authentication controller 128 may further interact with the access controller 206 to provide access to the permitted devices to the user based on the user login credentials.

In some examples, a password generator 222 may be included in a PMS 200. The password generator 222 may be configured to generate passwords to be used by PMS 200, and/or by other PMS 200. The passwords generated by the password generator 222 may be used as an active or a reserve password stored on password data 212 of PMS 200. The password generator 222 may generate passwords to be transmitted by transmitter 216 to other entities, not for use by the PMS 200 of which the password generator 222 forms part. A PMS 200 may also receive passwords via receiver 214 to be used as password data 212, which have not been generated by password generator 222 of that PMS 200.

Each of the receiver 214 and transmitter 216, memory 208 comprising program 210 and password database 212, and processor 202 comprising password updater 204, access controller 206, user authentication controller 218, and password generator 222 may be in data communication with the other features of the password management server 200 as required. The password management server 200 may be implemented as a combination of computer hardware and software. In particular, the password updater 204, access controller 206, user authentication controller 218 and password generator 222 may be implemented as software configured to run on one or more processors 202. The memory 208 may store several programs and/or executable files that are implemented by one or more processors 202, and also provides a storage unit for any required data. A single password management server 200 may comprise more than one processor 202, and more than one memory 208. Memory 208 may be contained within a housing of password management server 200, or alternatively, not shown in the figures, the whole or a portion of a memory 208 may be external memory. Alternatively or additionally, an external memory may comprise a backup of the whole or a portion of memory 208.

The password management server 200 is in data communication via a communication link 220 to another password management server 200. In order for the plurality of password management servers 200 forming a part of the password management system 100 to work together and consistently provide the functions of the password management system 100, they are in data communication with each other over a communication link 220. Consistent, in this instance, can mean that if a function can be offered by more than one of the PMS 200 of the password management systems, and a change occurs in one of the PMS that affects the working of this function, than this change will also be propagated to the other PMS which offer this function, so that a user requesting a specific function will receive a consistent result or outcome, regardless of which eligible PMS it requests to perform the function.

Communication links between different elements in the password management system may fail, wherein two elements of the system 100 which are in data communication with each other during normal operation of the system are not able to communicate with each other. A PMS 200 may lose communication with another PMS 200, with one or more devices D1-D5, with one or more users U1-U4, or with one or more other elements within the system. In the specific case wherein one PMS 200 loses contact with at least one other PMS 200, the system is considered to be in partition. The reasons for failure of a communication link, and the ability to mitigate them (for example, a power cut, weather damage, component wear, etc.) may be outside the control of the password management system and/or the at least one secure device. As a result, it is desirable to be able to provide methods and mechanisms to deal with a failure of a communication link, and allow a password management system to continue to function when in partition.

The system as described above is used to provide secure access to at least one password protected device D1-D5, using a plurality of password management servers, e.g. a first and a second password management server.

Figure 3:
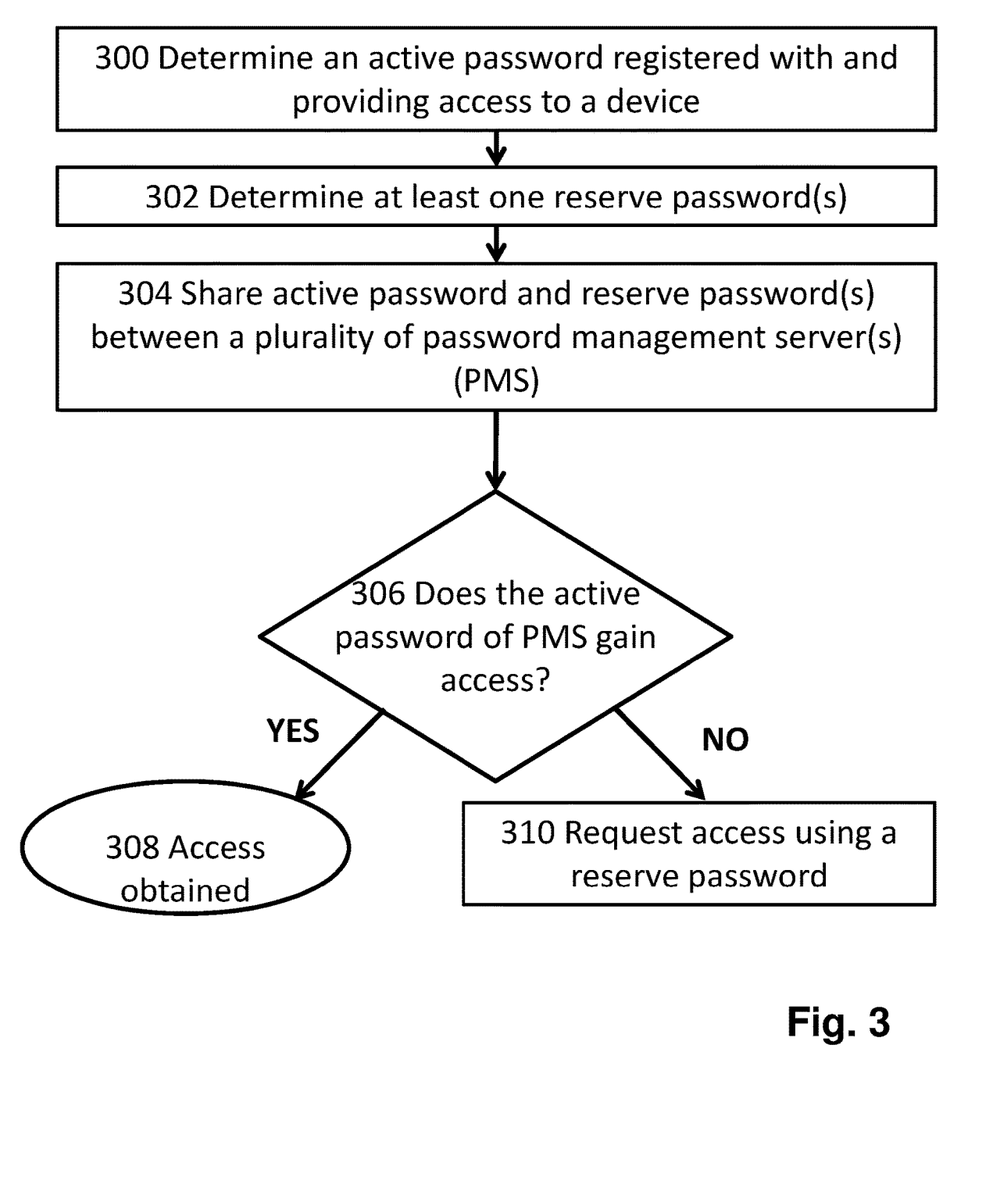
FIG. 3 shows a flow chart of an exemplary method for gaining access to a password protected device.

An active password is determined 300 by the password generator 222 of PMS1. At least one reserve password is generated 302 by the password generator 222 of PMS1. The active password can be set to be the device password of the at least one device. The communication link is used to transmit 304 the active password and at least one reserve password between with PMS2. In normal operation, the active password can be used 308 by either or both of PMS1 and PMS2 to gain access to the at least one password protected device D1-D5 and access is granted 308. If a device password is updated by PMS1, the active password at PMS1 is updated accordingly and this is communicated to PMS2. However, in some circumstances, such as a failure of the communication link 220, access is attempted 306 using the active password and PMS2 no longer manages to obtain access to the device using the active password and attempts 310 to gain access with one of one or more reserve passwords.

The password protected device may be separate from the plurality of PMS, and may be operated by an end user outside of the password management system. The password protected device may be write-only for the password management system, that is to say, the password management system may not have access to content available on the device. In particular, the password management system may not be able to request a device to provide its device access password, even after providing password management system identification. This means that the system cannot contact a device if it needs to restore its active password to be the same as the device password. The password protected device may be part of a secure system. Access to the password protected device may be provided to one of multiple accounts on a password protected device. The password protected device may be a part of a bigger system or device. There may be a plurality of password protected devices, and each of the password protected devices may have unique active and associated reserve passwords.

The communication link 220 may include any one of or a combination of a hard-wired communication link or a wireless link. A failure of the communication link may be caused by failure of a part of the communication link 220, or failure at one or more PMS 200 of hardware and/or software. A failed communication link 220 between a first and second PMS may result in the first and second PMS becoming partitioned such that no communication is possible between the first and second PMS. Alternatively, if the communication link has redundancy, failure of a single communication link does not result in a partitioned system. If a system contains redundancy and has multiple connections forming the communication link 220, failure of the communication link 220, in this instance, means failure of each of the connections, so that no communication of the update is possible over that link. The failure of the communication link 220 may be caused by, for example, damage to a portion of the hardware of the link, natural wear of the components, a faulty component, loss of power, an interruption of the connection between parts of the communication link, or signalling issues. The duration of a partition may be any amount of time but may typically be transient, that is to say, lasting only a short time and being impermanent in nature. The duration of the partition may be of the order of several seconds, hours, days, weeks, or months.

The active password and reserve password may be created contemporaneously and/or by the same password generator. One or more PMS 200 may comprise a password generator 222 configured to generate and determine an active password and at least one reserve password, or the passwords may be generated and determined by an external entity, such as a password generator not forming a part of a PMS 200 able to access the password-protected device, and communicated to one, several, or all of the PMS 200 over a data communication links. The PMS 200 may communicate the passwords between each other over communication link 220. The PMS 200 may have a database of reserve passwords, and a received password may not be committed to be a reserve password until the PMS have confirmed that they all have received the same password to be a reserve password. The password management system 100 may be in place to guarantee that the same at least one reserve passwords is available for both the first and second PMS 200. The reserve passwords in the database 212 stored by and/or accessible to multiple PMS 200 can be referred to as strongly consistent between the multiple PMS 200. If the database of reserve passwords strongly consistent between several PMS 200 comprises a plurality of reserve passwords, the reserve passwords may be ordered. This order may be the same in each PMS so that the next reserve password is the same for each PMS 200.

The active password and reserve password may be stored in a common memory 210. The active password and reserve password may be stored in a database comprising password data 212. The active password and reserve password may be stored in a location accessible to a PMS regardless of a partition occurring in the password management system 100. The active password and reserve password of a PMS 200 may be backed up inside the PMS 200, inside another PMS 200, or alternatively in an external memory, accessible by that PMS 200. In case an external memory is used, encryption, for example against a master encryption key, may be required to secure the active and/or reserve passwords stored in the external memory. The reserve password may be a plurality of reserve passwords. Additional reserve passwords for a password protected device may be added to the reserve password or plurality of reserve passwords in a password database 212 and shared between the different PMS 200 providing access to the password protected device. One or more additional reserve passwords may be provided after an active password has been updated and/or without the active password having been updated.

In order to help keep a password protected device secure on a network, the password to access the device can be updated from time to time. The update of a device password may be carried out for example in response to a particular time occurring, a time interval passing, or an event taking place (for example, the number of times the active password has been used to gain access, an incorrect login attempt wherein a wrong password is used, etc.). When a device can be accessed by a plurality of PMS 200, for example by the first and second PMS of FIG. 1, the updated device password should be distributed among all the PMS able to provide access to the device, so that each of those PMS 200 can update their active password to match the updated device password, and the functioning of the password management system 100 remains consistent.

When a PMS 200 fails to gain access using an active password, it may try to access the device using a reserve password. If there is more than one reserve password in password database 212 the PMS may have an ordering system in place to determine which of the plurality of reserve passwords to use. For example, the password data may store a sequential list of former, active, and reserve passwords. Further, a pointer or other indicator can be used to determine where in the sequence the active password is located by pointing to it. Reserve passwords are located ahead of the active password. If an attempt to gain access with a first reserve password is unsuccessful, the PMS 200 may try a subsequent reserve password if another, untried, reserve password is available. The PMS 200 may try every one of the reserve passwords stored on or accessible by the PMS 200. If a reserve password successfully gains access to the password protected device, the PMS 200 may update its active password to be this reserve password, and update the password database to remove this password from among the reserve passwords.

When PMS2 fails to gain access to the password protected device using the active password, it may contact the PMS1 200 via communication link 220 to determine whether the PMS1 has updated the device password and the active password to be one of the reserve passwords. If no response is received from PMS1, PMS2 concludes that the password management system is in partition. PMS2 may send this message prior to trying to gain access using the reserve password, or alternatively it may send the message after either or both of succeeding or failing to gain access to the device using the reserve password. In a system with more than two PMSs accessing the device, PMS2 may contact each of the other PMSs 200.

PMS2 may fail to gain access to the password protected device because the first and second PMS 200 are in partition and PMS1 has updated device password and the active password while the first and second PMS 200 have been in partition.

Figure 4:
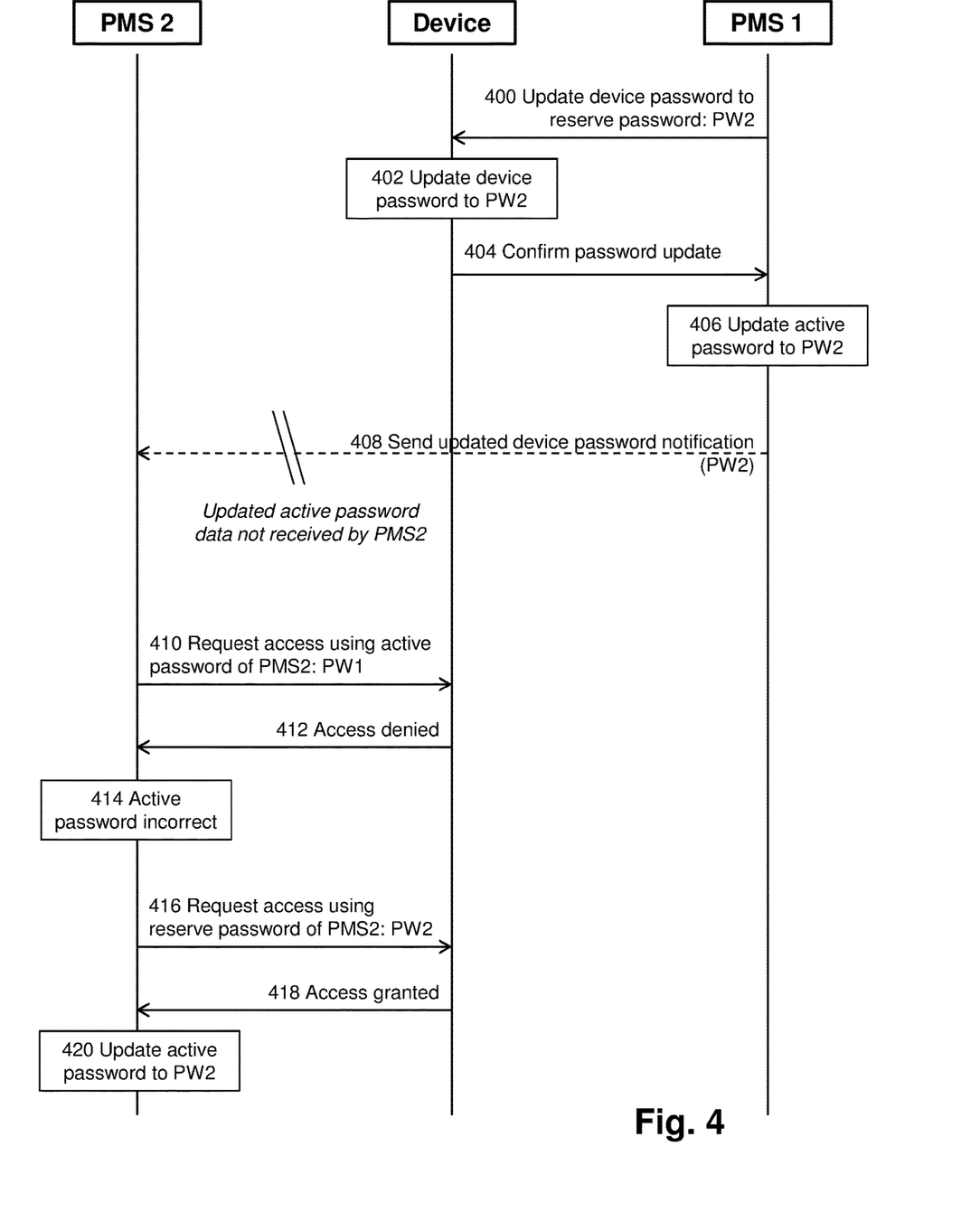
FIG. 4 shows a signalling flow diagram of an exemplary method for sharing update device password data.

FIG. 4 shows a signalling diagram in which the device password is updated by PMS1, and wherein the first and second PMSs 200 are in partition. When the PMS1 has determined that the device password should be updated, its password updater 204 accesses the device and transmits a request 400 to the device D1-D5 to update the device password to one of the at least one reserve password stored in PMS1, referred to as the reserve password, or PW2 in FIG. 4.

The device D1-D5 updates 402 the access password of the device to be the reserve password, and transmits 404 a confirmation of the password update to PMS1. In response to the password update confirmation, PMS1 updates 406 its active password to be the reserve password, and marks the reserve password as being used and is therefore no longer a reserve password. PMS1 transmits 408 notification of the update to PMS2, over the communication link 220, to instruct the PMS2 to update its active password to be the reserve password, and to mark the newly adopted reserve password from the database as no longer being a reserve password held by PMS2. The notification 408 sent over the communication link 220 may comprise information other than the updated password data itself. It may, for example, contain an instruction to move a pointer or indicator from one location to another in a sequence of former, active and reserve passwords in order to update the active password and reserve password data held by the PMS. The notification 408 may contain any other information from which the receiving PMS is able to determine the reserve password to be used as the updated active password.

In the example of FIG. 4, the notification of the updated active password is not received by PMS2. Therefore, PMS2 still considers the active password to be the previous active password of PMS1. Sometime later, the access controller 206 of PMS2 transmits 410 a request to access the device D1-D5 using its active password, which has not been updated. The device D1-D5 transmits 412 a denial of access and PMS2 determines 414 that its active password is incorrect.

The access controller 206 of PMS2 then transmits 416 a request to access the device D1-D5 using one of the reserve passwords. This may be done according to a predetermined order for using the reserve passwords. Further, multiple attempts may be made using different reserve passwords until access is granted.

In the example of FIG. 4, the reserve password corresponds to the updated active password of PMS1, which is now the device password following steps 400-404. Therefore, the device D1-D5 transmits 418 a notification that access is granted. PMS2 updates 420 its active password to be the reserve password that allowed access to the device D1-D5.

There are several ways in which a password management system can arrange the way in which a device password is updated, for example the system 100 can allocate a particular PMS 200 responsible for updating the device password, or it can allow multiple or all PMS 200 which are able to provide access to the device, to update the password. In one example, a first PMS may request permission from the other PMS able to access a device, when it wants to update the device password. The first PMS may do this by calling on the other PMS to notify them that it will update the device password. The other PMS 200 reply to this notification/request by granting or denying permission to update the device password. The other PMS 200 may grant permission by acknowledging receipt of the request/notification call without raising an objection, or it may specifically respond by granting permission/agreeing to a PMS 200 updating the device password. If at least one of the other PMS 200 denies the request for permission to update the device password, the PMS will not update the password.

Figure 5:
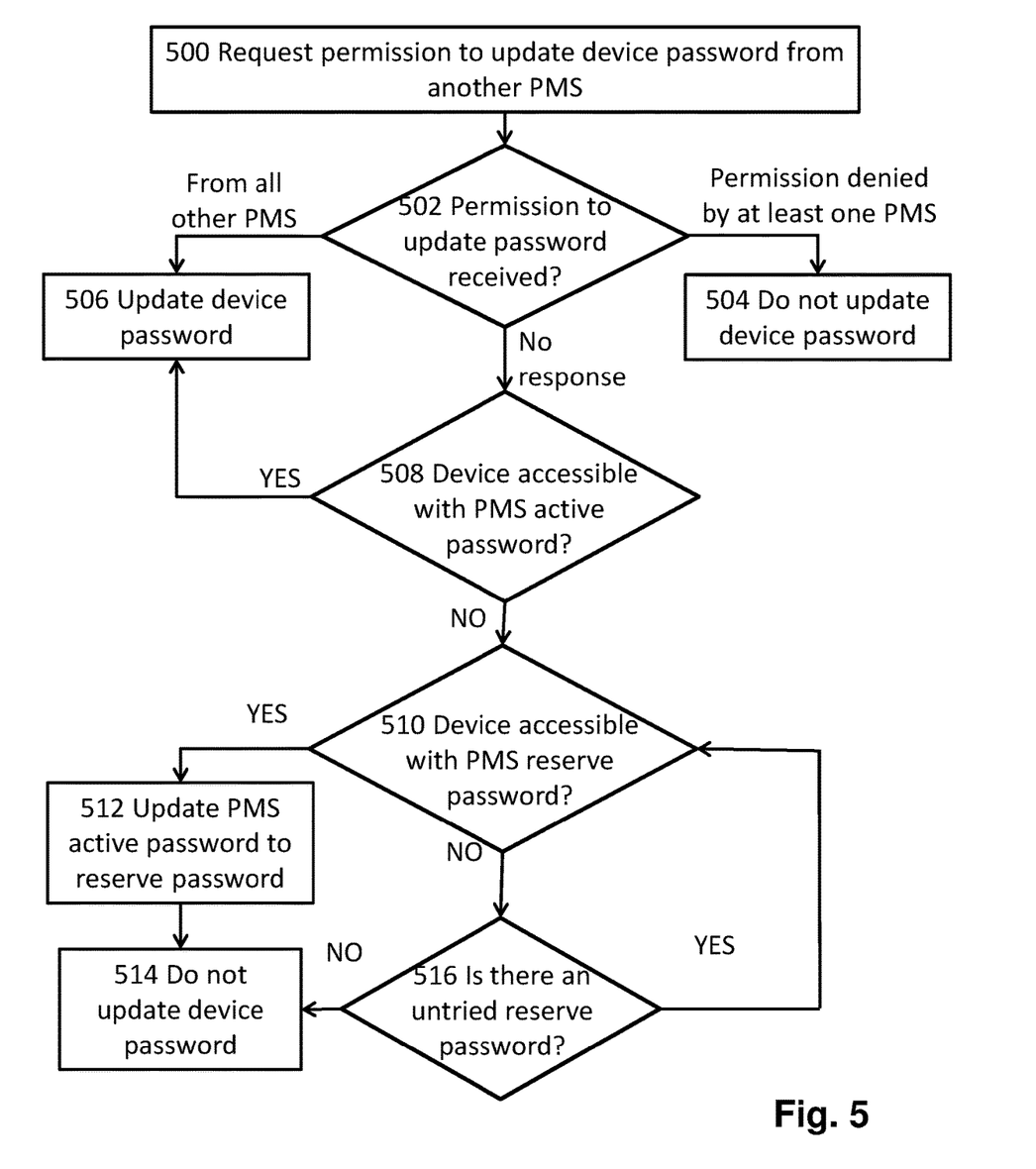
FIG. 5 shows a flow chart of an exemplary method for updating a device password.

FIG. 5 illustrates an example in which, when the PMS1 determines that is should update the device password, it sends out a request 500 and/or notification to the PMS2 and determines 502 whether permission is received in response. If the PMS1 receives a response message refusing permission from PMS2, the PMS1 will not update 504 the device password. If the PMS1 receives a response message granting permission/allowing the device password update, the PMS1 will proceed to update 506 the device as set out below. If the PMS1 does not receive a response from the PMS2 within the expected time frame, the PMS1 may decide that the first and second PMSs are in partition, based on the lack of response from the PMS2.

PMS1 may then attempt to determine whether or not to update the device password by attempting 508 to gain access with the active password, and deciding to update 506 the device password to be a reserve password if access is obtained, and optionally not to update the device password is access is refused. If PMS1 is refused access to the device using its active password, the PMS1 attempts 510 to gain access using a reserve password stored in the memory 210 of the PMS1.

If access is granted, the password updater 204 updates the active password of PMS1 and does not update 514 the device password. This process may be repeated 516 for a plurality of reserve passwords.

The method described above allows the system 100 with first and second PMS 200 to continue to update the device password to keep the device secure, while avoiding the situation in which the first and second PMS 200 both to update the device password when their active password appears out of date because the other PMS 200 has updated the device password to the reserve password.

A partition may be detected by a PMS 200, when the PMS requests a response from another, PMS 200 and does not receive a response. As a result of the lack of response, the PMS may determine that the communication link 220 connecting the first PMS 200 to the second PMS 200 may has failed. A duration/time interval following a request for response may be set in which a PMS expects to receive a response. The duration of the time interval may be set by each PMS and/or for each communication link 220 individually, or it may be standard. The duration may be set to, for example, 10 seconds, or may be variable, depending on for example, the speed of the data connection over the communication link, the size and complexity of the request and/or expected response, the speed of the processor 202 and memory 208 of the PMS 200 on both sides of the communication link, etc. The request and response may be quite simple, for example a ping, or more complex. The request and response may be sent specifically to test and confirm the status of the communication link 220, or the request and the response may be a communication containing significant information not related to checking the status of the communication link 220. A request-response message meant to test and confirm the status of a communication link 220 between the first and second PMS 200 may be initiated by both PMS 200. The request-response message to test and confirm the status of the communication link 220 may be sent at specific times and/or time intervals, or following a specific event, for example, not receiving a communication from another PMS for a predetermined amount of time.

Specifically, the call sent by a first PMS 200 to notify other PMS 200 that it is intending to update the device password, can be used by the first PMS to determine the status of a communication link 220 between the first and a second PMS 200: if no response from the second PMS 200 is received, the first PMS 200 determined the communication link 220 has failed.

In some examples, when a first PMS 200 updates a device password, it may record the update and optionally a time at which the device confirms that the password has been updated. This may be the time at which the confirmation of device password update was received, the time, recorded by the device, at which the device password was updated, or both.

The first PMS 200 may then send a notification (or update) message, including the updated device password, to the other PMS 200 capable of accessing the device, including a second PMS 200. If the first and second PMS 200 are in partition, the notification message will not be received by the second PMS 200 at the time when it is first sent. The first PMS 200 may determine that the update message was not received, if, for example, it does not receive an acknowledgement or receipt confirmation message from the second PMS 200 for the update message. Alternatively, the first PMS 200 may already be aware of the partition and understand that an update message sent over communication link 220 at that time would not be received. In response to the unsuccessful sending of the notification message, the first PMS may hold the notification message in a queue for sending when the communication link 220 between the first and second PMS 200 is restored. When the communication link 220 is restored, the held notification messages are sent and the second PMS 200 can use the messages to bring the active password in line with the updated active password of the first PMS 200 and the device password. This may be done irrespective of whether any reserve passwords are used by the first and/or second password management servers.

When a failed communication link 220 is restored, an update message queued to be sent over the link is transmitted to the receiving PMS 200. When the PMS receives the update message, it may use the update message to update its active password to match the updated password communicated in the update message.

The update message sent by a PMS 200 after updating a device password and its active password, may comprise one or more of identification of the PMS 200 which performed the update of the device password, the time of the device password update, and the updated password data. The updated password data may comprise the updated password itself, or other information enabling the other PMS to identify the updated password, for example identification data specifying a reserve password held on the receiving PMS 200, so it can update the active password to match the updated device password, without the updated password itself being sent over communication link 220.

A queue for holding an update message may contain multiple update messages. After a partition has been restored, a PMS 200 may receive update messages from several other PMS 200. The identification of the PMS 200 performing the device password update and update time of the device password allow the PMS 200 receiving the update message to correctly update the active password to be equal to the updated device password. The PMS 200 may use the identification of the PMS 200 performing the update to determine which reserve password was used to perform the update. If multiple update messages are received, the PMS 200 may use the update time to determine the most recent update and the amount of updates to determine which reserve password is currently in use. The PMS 200 may chronologically order the messages queued from one or other PMS 200 received after restoration of a failed communication link 220 in order to update the active and reserve passwords on the PMS to be in line with the other PMS 200. The queue holding messages to be sent over the failed communication link 220 may hold messages not relating to password updates.

In the above embodiments, a first and second PMS 200 can be any two PMS of a password management system 100 with a plurality of PMS 200, comprising two or more PMS 200.

Any mention of first, second, other, and/or multiple PMS 200 is used to distinguish in description between several PMS 200 when describing interactions between them. A PMS 200 of a password management system 100 is able to perform the functions described herein of a first, second, or other PMS 200. The password protected device can be any one of a plurality of password protected devices D1-D5 secured by the password management system 100.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

It will be appreciated by the person skilled in the art that various modifications may be made to the above described embodiments, without departing from the scope of the invention as defined in the appended claims. Features described in relation to various embodiments described above may be combined to form embodiments also covered in the scope of the invention.

It will be appreciated that the password management system may be configured to carry out any of the method steps recited above and disclosed herein. The password management system may include one or more processors configured to carry out one or more of the method steps recited above and disclosed herein.

The invention claimed is:

1. A method of providing access to at least one password protected device via a password management system comprising a first password management server and a second password management server in data communication via a communication link, the method comprising:

determining, at the first password management server, an active password, which is registerable as a device password with, and provides access to, the at least one password protected device, and at least one reserve password;

transmitting the active password and the at least one reserve password to the second password management server via the communication link, the active password for accessing the at least one password protected device from either or both first and second password management servers;

after communication of the active password and the at least one reserve password to the second password management server, determining that the first password management server and the second password management server are in partition;

updating, by the first password management server, the device password at the at least one password protected device;

further requesting, by the second password management server, access to the at least one password protected device using the active password;

determining that the further request using the active password does not provide access; and requesting access using one or more of the at least one reserve passwords.

2. The method according to claim 1, further comprising, when one of the at least one reserve password provides access to the at least one password protected device, updating the active password at the second password management server with the corresponding reserve password.

3. The method according to claim 1, further comprising the second password management server transmitting a message to the first password management server via the communication link to determine whether the first password management server has updated the active password registered with the at least one password protected device with one of the at least one reserve passwords.

4. The method according to claim 3, further comprising the second password management server determining that the communication link has failed when no response is received to the transmitted message.

5. The method according to claim 1, further comprising the first password management server updating the device password at the password protected device with one of the at least one reserve passwords and transmitting a notification of the update to the second password management server via the communication link.

6. The method according to claim 5, wherein a failure of the communication link between the first and second password management servers has occurred such that the second password management server does not receive the notification of the update.

7. The method according to claim 1, further comprising one of the first and second password management servers updating the device password registered with the device with one of the at least one reserve passwords, recording the time at which the device password was updated, and transmitting a notification of the update and the recorded time to the other of the first and second password management servers.

8. The method according to claim 7, further comprising, upon failure to send the notification to the other of the first and second password management servers, the one of the first and second password management servers holding the notification for sending when the communication link is restored.

9. The method according to claim 8, further comprising, after restoration of the failed communication link, the one of the first and second password management servers transmitting the notification, and the other of the first and second password management servers receiving the notification, and updating the active password to be consistent with the update based on the received notification.

10. The method according to claim 8 wherein the notification also contains an identification of the password management server performing the update.

11. The method according to claim 1, further comprising one of the first and second password management servers transmitting a request to the second password management server for permission to update the device password and taking one or more of the following actions:

when permission is received in response to the request, updating the device password to be one of the at least one reserve passwords;
when permission is denied in response to the request, not updating the device password to be one of the at least one reserve passwords;
when no response is received in response to the request:
  attempting to access the device with the active password and when access is granted, updating the device password to be one of the at least one reserve passwords;
  when access is not granted using the active password, attempting to access the device with one of the at least one reserve passwords and when access is granted, updating the active password for the one of the first and second password management servers to be one of the at least one reserve passwords.

12. The method according to claim 1, wherein the first password management server is scheduled, in a predetermined timeframe, to update the active password of the at least one password-protected device to be a predetermined one of the at least one reserve passwords,
  and wherein the second password management server, when it does not receive a notification by the end of the predetermined timeframe that this update has been performed, updates its active password to be the predetermined one of the at least one reserve passwords.

13. A method of restoring an active password in a password management server, the active password for providing access to at least one password protected device via a first password management server and second password management server in data communication via a communication link, the method comprising:
  determining at the first password management server, an active password which is registerable with and provides access to the at least one password protected device;
  transmitting the active password to the second password management server via the communication link;
  following a failure of the communication link, updating, at least once, the active password at the first password management server;
  following restoration of the communication link, transmitting notification of the at least one update to the active password from the first password management server to the second password management server;
  determining that the first password management server and the second password management server are in partition,
  updating, by the first password management server, the device password at the at least one password protected device; and
  restoring the active password at the second password management server based on the transmitted notification.

14. The method according to claim 13, further comprising recording a time of the at least one update to the active password, wherein the transmitted notification comprises the recorded time.

15. The method according to claim 13, wherein the first and second password management server are any of a plurality of password management servers.

16. The method according to claim 13, wherein the device is one of a plurality of devices.

17. A non-transitory computer readable storage medium comprising instructions which, when executed on at least one processor, cause the at least one processor to carry out the method according to claim 1.

18. A non-transitory computer readable storage medium comprising instructions which, when executed on at least one processor, cause the at least one processor to carry out the method according to claim 13.

19. A password management system for providing access to at least one password protected device according to the method claim 1 recites, the password management system comprising:
  the first password management server comprising a first memory;
  the second password management server comprising a second memory; and
  the communication link connecting the first and second password management servers.

20. A password management system for providing access to at least one password protected device, the password management system comprising:
  a first password management server;
  a second password management server; and
  a communication link connecting the first and second password management servers;
  the first password management server comprising a non-transitory computer-readable medium and a processor configured to undertake the steps of:
    determining at the first password management server, an active password which is registerable with and provides access to the at least one password protected device;
    transmitting the active password to the second password management server via the communication link;
    following a failure of the communication link, updating, at least once, the active password at the first password management server;
    following restoration of the communication link, transmitting notification of the at least one update to the active password from the first password management server to the second password management server;
    determining that the first password management server and the second password management server are in partition;
    updating, by the first password management server, the device password at the at least one password protected device;
  and the second password management server comprising a non-transitory computer-readable medium and a processor configured to undertake the steps of:
    receiving the transmitted notification; and
    restoring the active password at the second password management server based on the transmitted notification.

* * * * *